United States Patent
Seshadri et al.

(10) Patent No.: US 11,645,164 B2
(45) Date of Patent: May 9, 2023

(54) ADJUSTING DATA BACKUPS BASED ON SYSTEM DETAILS

(71) Applicant: International Business Machines Corporation, Armonk, NY (US)

(72) Inventors: Sangeetha Seshadri, Plano, CA (US); Priyaranjan Behera, Santa Clara, CA (US); Paul Henri Muench, San Jose, CA (US); Umesh Deshpande, San Jose, CA (US); Nicholas Linck, San Jose, CA (US); Wilfred Edmund Plouffe, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/400,015

(22) Filed: Aug. 11, 2021

(65) Prior Publication Data

US 2023/0051637 A1   Feb. 16, 2023

(51) Int. Cl.
*G06F 11/14* (2006.01)
(52) U.S. Cl.
CPC ...... *G06F 11/1461* (2013.01); *G06F 11/1464* (2013.01); *G06F 2201/84* (2013.01)
(58) Field of Classification Search
None
See application file for complete search history.

(56) References Cited

U.S. PATENT DOCUMENTS

| | | | |
|---|---|---|---|
| 8,046,632 B2 | 10/2011 | Miwa et al. | |
| 9,185,188 B1 | 11/2015 | Li | |
| 9,519,432 B1 | 12/2016 | Haustein et al. | |
| 10,318,387 B1 | 6/2019 | Chopra et al. | |
| 10,824,514 B2 | 11/2020 | Abdul Kadar et al. | |
| 2019/0073254 A1* | 3/2019 | Vibhor | G06F 11/0784 |
| 2019/0129798 A1* | 5/2019 | Mutha | G06F 11/1402 |
| 2021/0240575 A1* | 8/2021 | Mulheren | G06F 11/1456 |
| 2021/0397474 A1* | 12/2021 | Srinivasan | G06F 9/45558 |

FOREIGN PATENT DOCUMENTS

WO   2010010393 A1   1/2010

OTHER PUBLICATIONS

Sousa et al., "Engineering Software for the Cloud: Automated Recovery and Scheduler," Proceedings of the 23rd European Conference on Pattern Languages of Programs, Jul. 2018, 8 pages.
Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Version 15, Oct. 7, 2009, pp. 1-2.

(Continued)

*Primary Examiner* — Eddy Cheung
(74) *Attorney, Agent, or Firm* — Zilka-Kotab, P.C.

(57) ABSTRACT

A computer-implemented method according to one embodiment includes retrieving details of a data backup system; determining whether a first data backup operation will complete within the data backup system before a second data backup operation is initiated within the data backup system, based on the details of the data backup system; and conditionally adjusting one or more elements of the data backup system, based on the determining.

19 Claims, 5 Drawing Sheets

(56) References Cited

OTHER PUBLICATIONS

Mell et al., "The NIST Definition of Cloud Computing," Recommendations of the National Institute of Standards and Technology, NIST Special Publication 800-145, Sep. 2011, pp. 1-7.
CSRC, "Cloud Computing," Computer Security Resource Center, Oct. 2017, 3 pages, retrieved from https://csrc.nist.gov/projects/cloud-computing.
Commvault, "Advanced Backup Options (Job Retry)," Commvault Systems, Inc , Feature Release 11.20, Apr. 2019, 2 pages. Retrieved from https://documentation.commvault.com/commvault/v11/article?p=57748.htm.
Gitlab, "GitLab com database incident," GitLab, 2017, 9 pages, retrieved from https://about.gitlab.com/blog/2017/02/01/gitlab-dot-com-database-incident/.

* cited by examiner

ADJUSTING DATA BACKUPS BASED ON SYSTEM DETAILS

BACKGROUND

The present invention relates to data backups, and more particularly, this invention relates to managing data backup implementations.

Data backup systems are commonly used to perform periodic backups of important data for one or more data computing/storage systems. However, these data backup systems may experience issues such as component failure, data network outages, power loss, etc. In response to these issues, a first scheduled data backup may not complete before a second scheduled data backup is initiated, and the simultaneous performance of these two data backups may negatively affect a performance of the data backup system.

BRIEF SUMMARY

A computer-implemented method according to one embodiment includes retrieving details of a data backup system; determining whether a first data backup operation will complete within the data backup system before a second data backup operation is initiated within the data backup system, based on the details of the data backup system; and conditionally adjusting one or more elements of the data backup system, based on the determining.

According to another embodiment, a computer program product includes one or more computer readable storage media, and program instructions collectively stored on the one or more computer readable storage media, where the program instructions include instructions configured to cause one or more processors to perform a method including retrieving, by the one or more processors, details of a data backup system; determining, by the one or more processors, whether a first data backup operation will complete within the data backup system before a second data backup operation is initiated within the data backup system, based on the details of the data backup system; and conditionally adjusting one or more elements of the data backup system by the one or more processors, based on the determining.

According to another embodiment, a system includes a processor; and logic integrated with the processor, executable by the processor, or integrated with and executable by the processor, where the logic is configured to retrieve details of a data backup system; determine whether a first data backup operation will complete within the data backup system before a second data backup operation is initiated within the data backup system, based on the details of the data backup system; and conditionally adjust one or more elements of the data backup system, based on the determining.

Other aspects and embodiments of the present invention will become apparent from the following detailed description, which, when taken in conjunction with the drawings, illustrate by way of example the principles of the invention.

DETAILED DESCRIPTION

Figure 1:
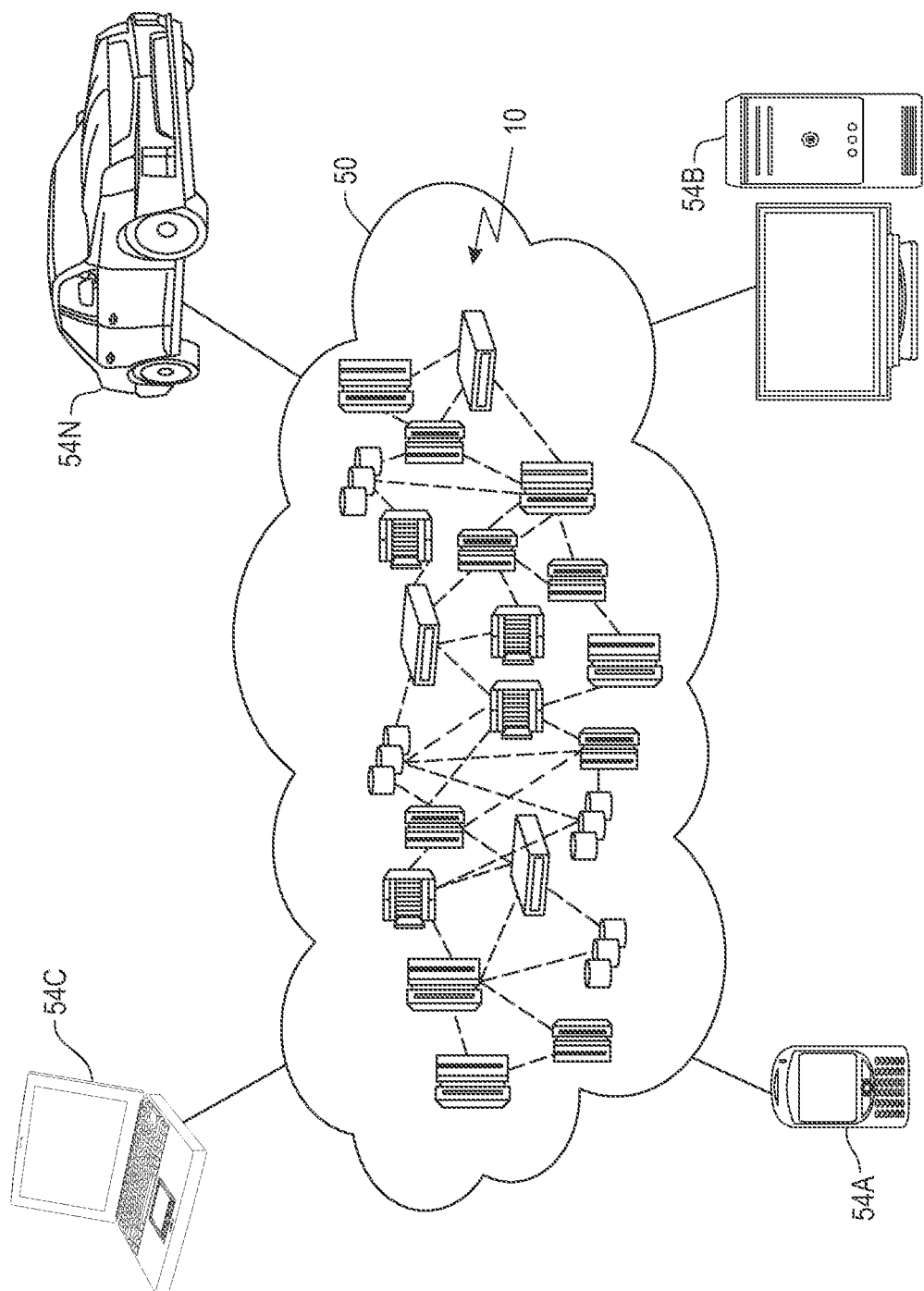
FIG. 1 depicts a cloud computing environment in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of performing content-aware node selection for container creation.

In one general embodiment, a computer-implemented method includes retrieving details of a data backup system; determining whether a first data backup operation will complete within the data backup system before a second data backup operation is initiated within the data backup system, based on the details of the data backup system; and conditionally adjusting one or more elements of the data backup system, based on the determining.

In another general embodiment, a computer program product includes one or more computer readable storage media, and program instructions collectively stored on the one or more computer readable storage media, where the program instructions include instructions configured to cause one or more processors to perform a method including retrieving, by the one or more processors, details of a data backup system; determining, by the one or more processors, whether a first data backup operation will complete within the data backup system before a second data backup operation is initiated within the data backup system, based on the details of the data backup system; and conditionally adjusting one or more elements of the data backup system by the one or more processors, based on the determining.

In another general embodiment, a system includes a processor; and logic integrated with the processor, executable by the processor, or integrated with and executable by the processor, where the logic is configured to retrieve details of a data backup system; determine whether a first data backup operation will complete within the data backup system before a second data backup operation is initiated within the data backup system, based on the details of the data backup system; and conditionally adjust one or more elements of the data backup system, based on the determining.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
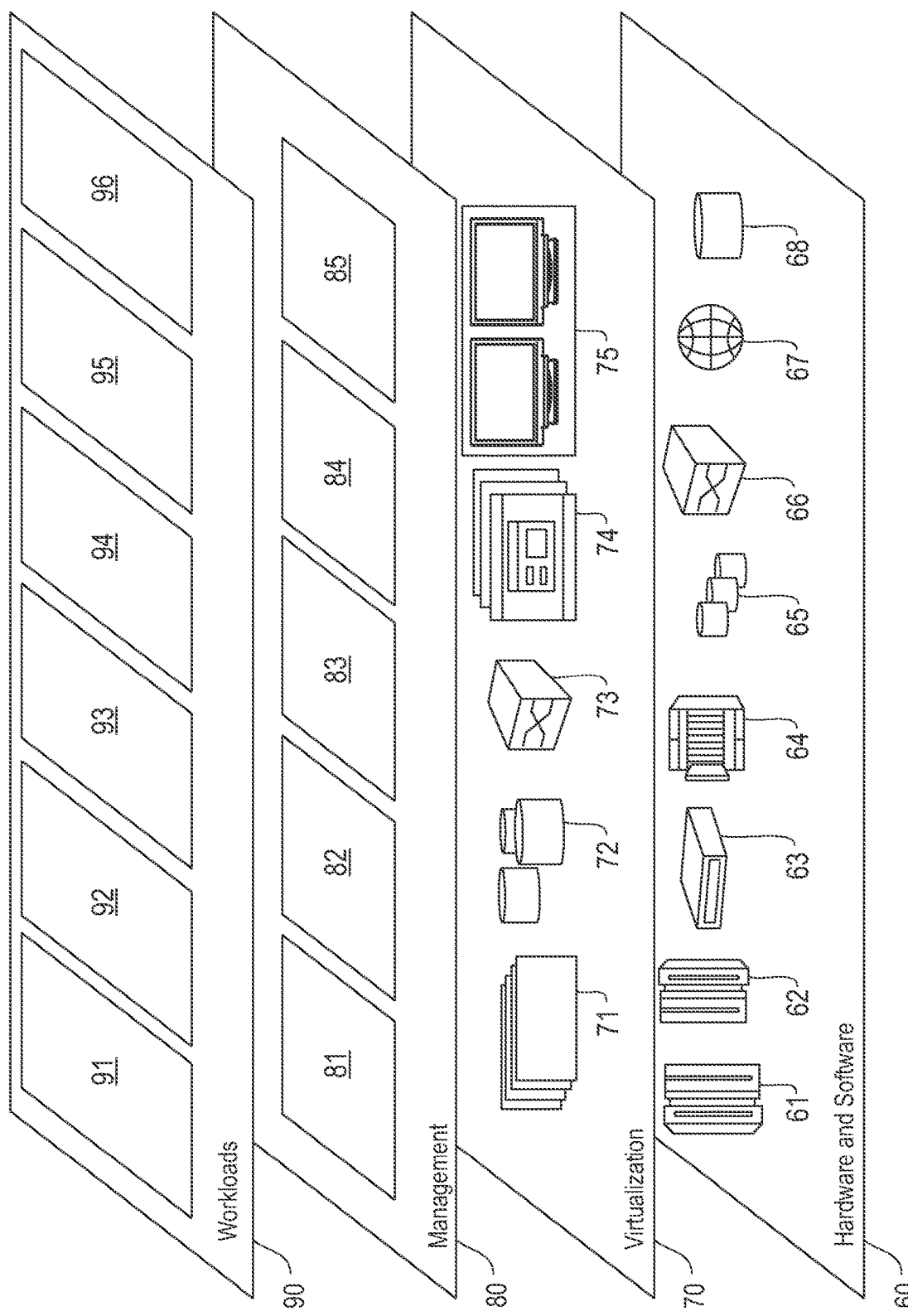
FIG. 2 depicts abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data backup implementation 96.

Figure 3:
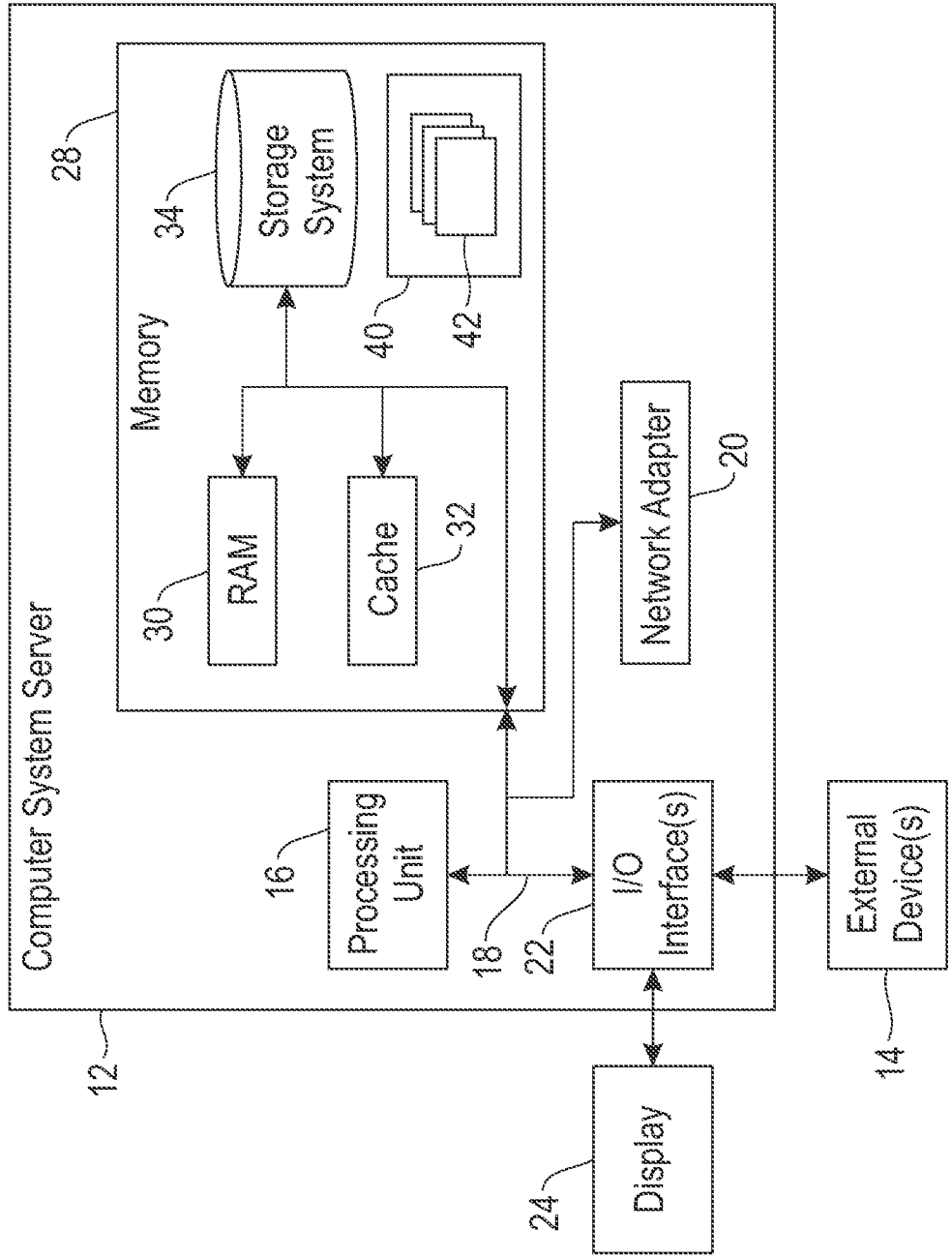
FIG. 3 depicts a cloud computing node in accordance with one embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
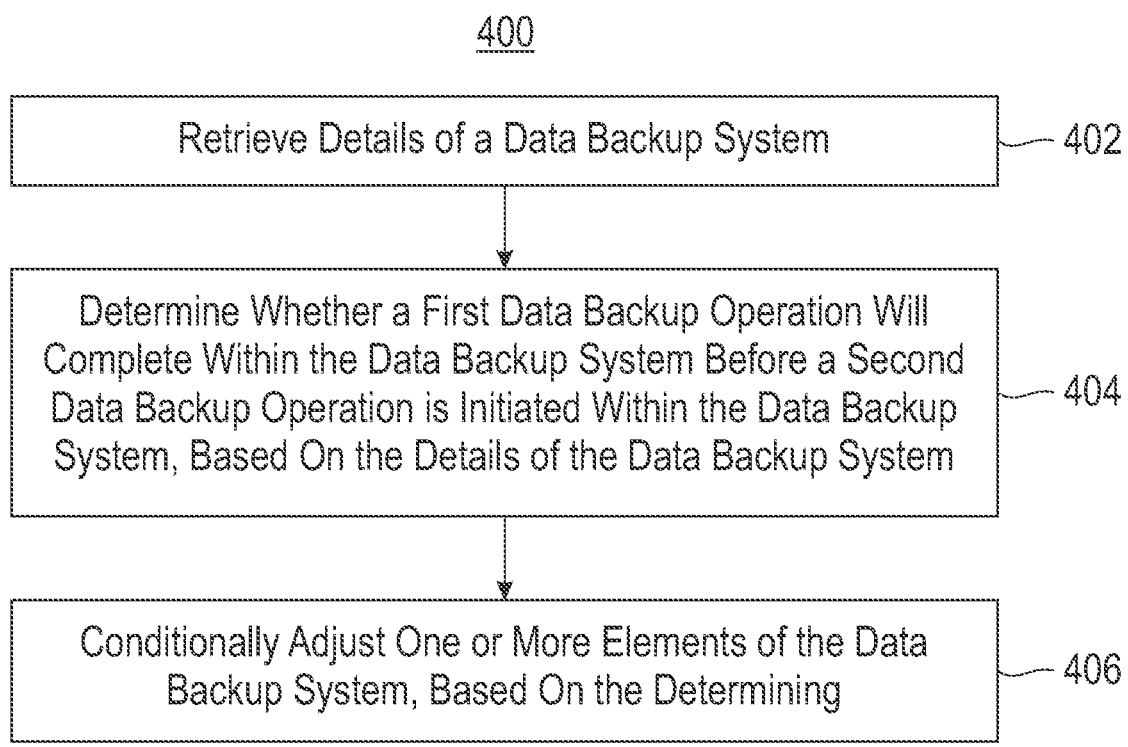
FIG. 4 illustrates a flowchart of a method for adjusting data backups based on system details, in accordance with one embodiment of the present invention.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where details of a data backup system are received. In one embodiment, the data backup system may include any system that performs one or more data backups for one or more computing systems. In another embodiment, the data backup system may be located within the computing system that is being backed up. For example, the data backup system may include one or more storage devices within the computing system.

Additionally, in one embodiment, the data backup system may be separate from the computing system that is being backed up. For example, the data backup system may include one or more storage devices directly connected to the computing system, one or more storage devices indirectly connected to the computing system via one or more computer networks, etc. In another embodiment, the data backup system may include a distributed storage system (e.g., a cloud-based distributed storage system, etc.).

Further, in one embodiment, the details of the data backup system may include current performance data associated with the data backup system. For example, the performance data may include a current data transfer rate within the data backup system. For example, the performance data may include a currently available read/write bandwidth for one or more storage devices within the data backup system.

Further still, in one embodiment, the performance data may include a current and/or future data load within the data backup system. For example, the performance data may include a current number of backup operations being performed within the data backup system, a predicted number of backup operations to be performed within the data backup system for a predetermined future time period, etc. For instance, the predicted number of backup operations may be determined by extrapolating past backup operations performed during similar time periods, with similar users, etc.

Also, in one embodiment, the performance data associated with the data backup system may be obtained from one or more daemons. For example, one or more daemons located within the data backup system may identify the performance data and may report the performance data to one or more additional systems.

In addition, in one embodiment, the details of the data backup system may include a current state of a network associated with the data backup system. For example, the network associated with the data backup system may include a network providing data communication between a computing system that is being backed up and the data backup system. In another example, the network associated with the data backup system may include a network providing data communication within the data backup system (e.g., between distributed storage nodes within the data backup system, etc.).

Furthermore, in one embodiment, the state of the network may include an identification of one or more current bottlenecks within the network. In another embodiment, state of the network may include an identification of current network traffic information for one or more networks of the data backup system, for one or more networks connecting to the data backup system, etc. For example, the state of the network may include a current network throughput to backup storage within the data backup system, a current network throughput between components within the backup system, etc.

Further still, in one embodiment, the details of the data backup system may include one or more predetermined capacity metrics for the data backup system. For example, the predetermined capacity metrics may be predetermined for a certain client/customer/user of the data backup system. In another example, the predetermined capacity metrics may include a maximum storage capacity within the data backup system that is allocated to a user, a maximum network bandwidth within the data backup system that is allocated to a user, etc.

Also, in one embodiment, the details of the data backup system may include one or more health parameters for the data backup system. For example, the one or more health parameters may include an overall health of one or more components of the data backup system. In another example, the one or more health parameters may include an identification of one or more current hardware or software failures within the data backup system.

Additionally, method 400 may proceed with operation 404, where it is determined whether a first data backup operation will complete within the data backup system before a second data backup operation is initiated within the data backup system, based on the details of the data backup system. In one embodiment, the first data backup operation may include a first scheduled backup operation for one or more instances of data, for one or more predetermined locations of data (e.g., one or more folders, drives, etc.), etc. In another embodiment, the second data backup operation may include a second scheduled backup operation for the same instances of data and/or predetermined locations of data as the first data backup operation.

Further, in one embodiment, the first data backup operation and the second data backup operation may be initiated within the data backup system according to a predetermined schedule. In another embodiment, the predetermined schedule may be determined based on a recovery point objective (RPO) within a service level agreement (SLA) for a user or organization (e.g., an organization whose data is being backed up utilizing the data backup system, etc.). For example, the RPO may indicate that a data loss of N hours is tolerable, in which case the second data backup may be scheduled to initiate N hours after the first data backup is scheduled to initiate within the predetermined schedule.

Further still, in one embodiment, the first data backup operation may include a backup operation that is currently being performed utilizing the data backup system (e.g., when the details of the data backup system were retrieved, etc.). In another embodiment, the second data backup operation may include a backup operation that is not currently being performed utilizing the data backup system but is scheduled to be initiated in the future according to the predetermined schedule.

Also, in one embodiment, the details of the data backup system may be analyzed to estimate a time of completion for the first data backup operation. In another embodiment, the details of the data backup system may be compared to historical data backup system details, where the historical data backup system details are associated with logged data backup operation completion times. In yet another embodiment, based on the comparison, a time of completion for the first data backup operation may be extrapolated.

In addition, in one embodiment, linear regression may be performed on the details of the data backup system to predict a completion time for the first data backup operation. In another embodiment, a machine learning environment may be trained with historical details of the data backup system as well as associated historical data backup operation completion times. For example, the current details of the data backup system may be input into the trained machine learning environment, and the machine learning environment may output an estimated completion time for the first data backup operation.

Furthermore, in one embodiment, the estimated time of completion for the first data backup operation may be compared to a scheduled initiation time for the second data backup operation. For example, in response to determining that the estimated time of completion for the first data backup operation does not exceed the scheduled initiation time for the second data backup operation, it may be determined that the first data backup operation will succeed (e.g., will complete before the initiation of the second data backup operation). In another example, in response to determining that the estimated time of completion for the first data backup operation exceeds the scheduled initiation time for the second data backup operation, it may be determined that the first data backup operation will fail (e.g., will not complete before the initiation of the second data backup operation).

Further still, method 400 may proceed with operation 406, where one or more elements of the data backup system are adjusted based on the determining. In one embodiment, in response to determining that the first data backup operation will succeed within its allocated time (e.g., will complete before the initiation of the second data backup operation), the first data backup operation may be maintained, and the second data backup operation may be maintained within a scheduler of the data backup system. In another embodiment, in response to determining that the first data backup operation will not succeed within its allocated time (e.g., will not complete before the initiation of the second data backup operation), or the first data backup operation that is currently running within the data backup system may be aborted/cancelled. In another embodiment, in response to determining that the first data backup operation will not succeed within its allocated time, the second data backup operation may be removed from/disabled within a scheduler of the data backup system.

For example, in response to determining that the first data backup operation will not succeed within its allocated time (e.g., will not complete before the initiation of the second data backup operation), the first data backup operation may be aborted/cancelled. In yet another embodiment, a deadline and/or priority value of the first data backup operation may be compared to deadline/priority values of other backup operations currently running within the data backup system. If the deadline of the first data backup operation is sooner than the deadline of another backup operation currently running within the data backup system, and/or a priority of the first data backup operation is greater than a priority of another backup operation currently running within the data backup system, the other backup operation may be aborted/cancelled instead of the first data backup operation.

In yet another embodiment, in response to determining that the first data backup operation will not succeed within its allocated time (e.g., will not complete before the initiation of the second data backup operation), the second data backup operation may be removed from/disabled within a scheduler of the data backup system. In yet another embodiment, a deadline and/or priority value of the second data backup operation may be compared to deadline/priority values of other scheduled backup operations that are not currently running but are to be run in the future within the data backup system. If the deadline of the second data backup operation is sooner than the deadline of another scheduled backup operation within the data backup system, and/or a priority of the second data backup operation is greater than a priority of another scheduled backup operation within the data backup system, the other scheduled backup operation may be removed from the scheduler instead of the second data backup operation.

Also, in one embodiment, in response to determining that the first data backup operation will not succeed within its allocated time (e.g., will not complete before the initiation of the second data backup operation), the first data backup operation may be maintained, and one or more resources of the data backup system may be adjusted. For example, additional storage, additional processing capabilities, and/or additional bandwidth may be allocated to the first data backup operation within the data backup system. These adjustments may expedite the completion of the first data backup operation.

Additionally, in one embodiment, updated details of the data backup system may be retrieved after the adjustments have been made (e.g., at a predetermined time interval after the adjustments, etc.) and analyzed to determine whether the first data backup operation will now complete within the data backup system before the second data backup operation is initiated within the data backup system. In another embodiment, in response to determining that the first data backup operation will still not succeed within its allocated time, the second data backup operation may be removed from/disabled within a scheduler of the data backup system, or the first data backup operation may be aborted/cancelled, and/or one or more additional resources of the data backup system may be adjusted until it is determined that the first data backup operation will succeed within its allocated time. These additional resources may be maintained or removed during subsequent backup operations (e.g., according to one or more predetermined settings, etc.).

Further, in one embodiment, updated details of the data backup system may be periodically retrieved and analyzed until it is determined that the first data backup operation will succeed within its allocated time, or that the first data backup operation has been aborted or the second data backup operation has been removed from/disabled within the scheduler of the data backup system. In another embodiment, in response to removing the second data backup operation from the scheduler (or cancelling the first data backup operation, or disabling the second data backup operation), updated details of the data backup system may be periodically retrieved and analyzed (e.g., according to a predetermined time period occurring sooner than the end of the allocated time for the first data backup operation) to determine whether to restart the cancelled/removed data backup operation.

For example, if the updated details are analyzed and indicate that the first data backup operation will now succeed within its allocated time (or has a predetermined percentage of success above a predetermined threshold), the cancelled/removed data backup operation may be restarted within the scheduler. In this way, the data backup system details may be analyzed according to a sliding window implementation, which may avoid unnecessary data backup cancellations due to usage spikes within the data backup system.

Further still, in one embodiment, in response to determining that the first data backup operation will not succeed within its allocated time, the data backup system may be analyzed to identify one or more specific failures and/or issues within the data backup system. For example, these identified failures/issues may be reported (e.g., sent to one or more users, etc.) so that they may be resolved. One or more specific failures/issues may then be resolved, and the cancelled/removed data backup operation may then be restarted automatically.

In this way, an overlapping of the first data backup operation and the second data backup operation may be avoided, which may reduce an amount of processing performed by the data backup system and may also reduce an amount of bandwidth utilized by the data backup system. Avoiding this overlap may also prevent bottlenecks from forming within the data backup system and may prevent failure of one or more components of the data backup system due to overload. This may improve a performance of hardware processing components within the data backup system.

Figure 5:
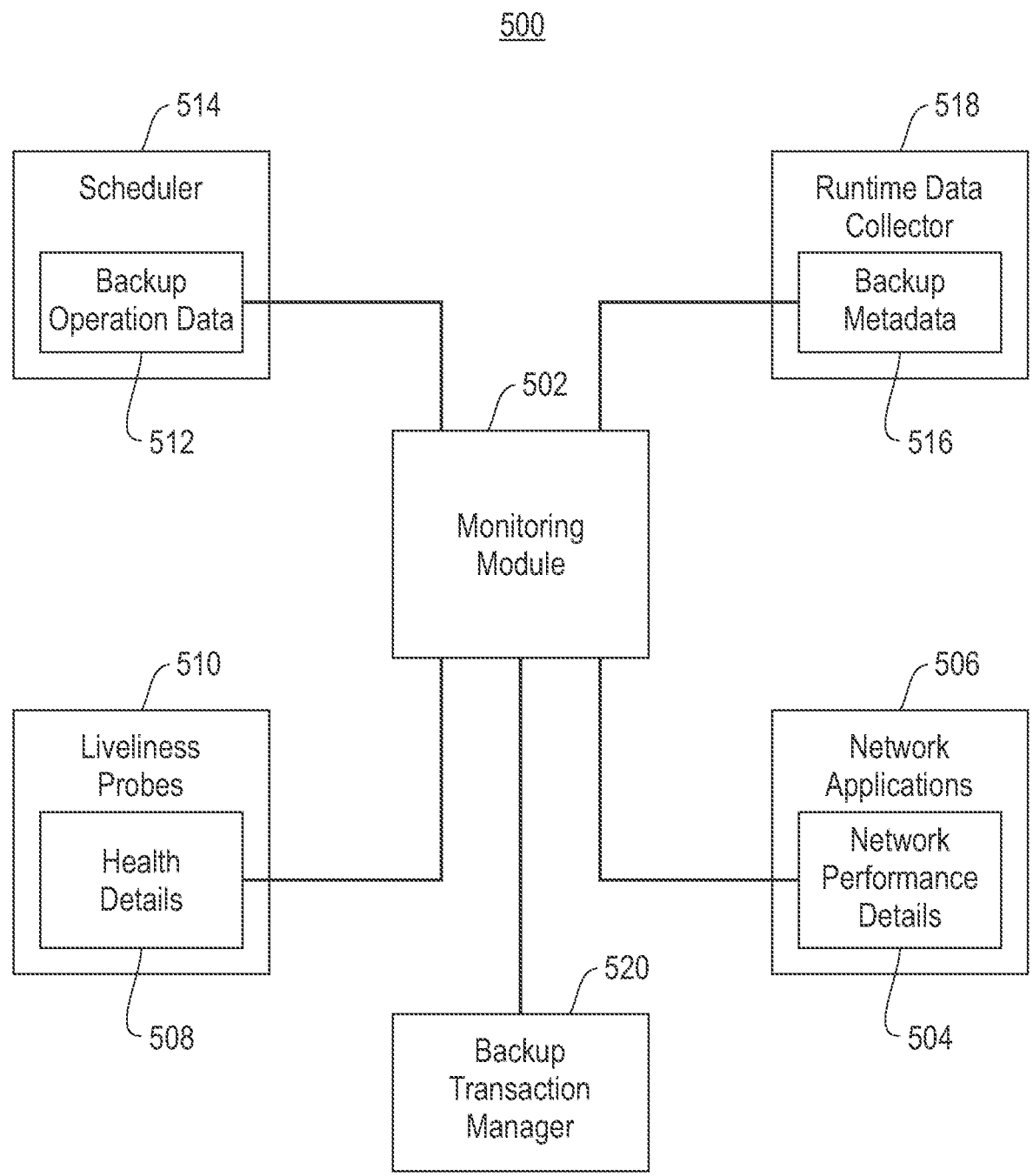
FIG. 5 illustrates an exemplary data backup system management environment, in accordance with one embodiment of the present invention.

FIG. 5 illustrates an exemplary data backup system management environment 500, according to one exemplary embodiment. As shown, a monitoring module 502 receives network performance details 504 from network applications 506. In one embodiment, these network performance details 504 may include performance details of networks within and/or connected to the data backup system, including container performance and/or network metrics, a status of physical components of the network, a topology of the network, etc.

Additionally, the monitoring module 502 receives data backup system component health details 508 from liveness probes 510 implemented within the data backup system. In one embodiment, the data backup system component health details 508 may include an overall health of one or more components, one or more component failures, etc.

Further, the monitoring module 502 receives backup operation data 512 from a backup operation scheduler 514. In one embodiment, the backup operation data 512 may include current backup operations being performed within the data backup system, future backup operations to be performed within the data backup system, as well as scheduled initiation and/or completion times for all backup operations.

Further still, the monitoring module 502 receives current backup operation metadata 516 from a backup runtime data collector 518. In one embodiment, the current backup operation metadata 516 may include an indication of how current backups are performing within the data backup system (e.g., how long backups are currently taking to complete, how long historical backups took to complete, etc.)

Also, in one embodiment, the monitoring module 502 analyzes the network performance details 504, the data backup system component health details 508, the backup operation data 512, and the current backup operation metadata 516 to determine whether a current data backup operation will complete within the data backup system before the next scheduled data backup operation is initiated within the data backup system.

In one embodiment, in response to determining that the current data backup operation will not complete within the data backup system before the next scheduled data backup operation is initiated within the data backup system, the monitoring module 502 may instruct the backup transaction manager 520 to cancel the current data backup operation or remove the next scheduled data backup operation and/or increase an amount of resources utilized by the data backup system to complete the current data backup operation.

In another embodiment, if the monitoring module 502 may instruct the backup transaction manager 520 to cancel the current data backup operation or remove the next scheduled data backup operation, the monitoring module 502 may periodically (e.g., before the next scheduled data backup operation) retrieve updated network performance details 504, data backup system component health details 508, backup operation data 512, and current backup operation metadata 516, and may analyze this updated information to determine whether to instruct the backup transaction manager 520 to restart the cancelled or removed data backup operation.

In yet another embodiment, if the monitoring module 502 may instruct the backup transaction manager 520 to increase an amount of resources utilized by the data backup system, the monitoring module 502 may periodically (e.g., before the next scheduled data backup operation) retrieve updated network performance details 504, data backup system component health details 508, backup operation data 512, and current backup operation metadata 516, and may analyze this updated information to determine whether the current data backup operation will now complete within the data backup system before the next scheduled data backup operation is initiated within the data backup system. Upon determining that the current data backup operation will now complete within the data backup system before the next scheduled data backup operation is initiated within the data backup system, the monitoring module 502 may instruct the backup transaction manager 520 to restart the cancelled or removed data backup operation.

In this way, the monitoring module 502 may analyze multiple factors within the data backup system and may analyze those factors to avoid data backup operation overlap within the data backup system.

Performance Aware SLA Management for Backup Operations

Failed data backups can lead to serious data loss. Current methods to address data loss try until failure or until the time to complete an operation has expired. This consumes resources and further aggravates the bottlenecks even if the backup operation will be aborted in the future. The backup operations in a distributed cloud backup service can encounter performance degradation or component breakdowns.

In one embodiment, backup SLAs may be managed for volumes by proactively managing failures. Performance issues addressed include:

Slower backups due to system overloading with multiple consecutive backups

Data transfer bottlenecks due to I/O operations in the cluster

Down time of critical components in backup software (e.g., backup storage or backend backup software)

Lack of scaling for backup deployments

In one embodiment, a mechanism for improved management of backup operations makes decisions based on performance and system metrics. For example, data regarding backup performance and system status is periodically collected from system components. Additionally, data network topology information of the infrastructure is periodically collected to determine the failure points in the backup workflow. Also, it is determined whether to abort backup/restart operations based on an estimation of a success of a current backup job. For aborted jobs, the estimate is periodically refreshed to determine if the job is to be retried (which may reduce the RPO).

In one embodiment, the following data may be collected:

Performance Data—Backup-as-a-Service: Includes metrics from all components in the product. This may be obtained by installing data collection agents in one or more containers. The backup scheduler can collect performance data from the components. A metrics API may be used as well. Metadata regarding a number of ongoing backup operations and estimated new backup operations may also be collected. This data may be obtained from a scheduler of a backup solution which triggers the backup operations based on system metrics.

System Metrics—System Metrics from the Cluster: These metrics may be obtained by using one or more monitoring frameworks native to the system. The data is collected for the cluster by default and can be made available.

System Status—Availability of Software External to BaaS—Liveness probes for the external components can be created to obtain this data.

Network Metrics—Metrics of the network traffic between components in the backup solution as well as physical components installed for the cluster may be obtained. This may include I/O traffic and API calls. Built-in frameworks may provide a provision to collect network metrics in the cluster. Other solutions can be used to obtain the network statistics and topology of the physical components of the infrastructure. This information can help correlate failures to specific physical network components (such as routers or racks) and logical system components (such as proxies, repositories, etc.).

Capacity Metrics—A capacity of the various components involved in the backup operations may be obtained (which includes storage capacity, available bandwidth, etc.). These metrics may be static and entered by a user during an initial configuration. Services provided by hardware can be used to retrieve this data and can be updated if the setup of the system changes on the fly.

Exemplary Implementation

In one embodiment, it may be determined whether a current triggered backup operation is expected to finish before the next backup invocation. If no, then the current backup (or the next backup) may be aborted. The estimated time to be taken by the operation can be determined by using a liner regression of the metrics taken from current state of the cluster and backup solution. The estimated time will be compared with the RPO set for the volume to determine if a successful backup operation can be performed.

In another embodiment, a user may have the option to abort the next backup operation and let the current backup continue. Additionally, a linear regression model may be used. For example, the model may take one or more of the following information as input: available bandwidth, CPU, memory and other resource usage, current backup operations, upcoming backup operation, backup software limits on data transfer, etc. The model may produce the following as output: an estimated completion of a backup operation.

Also, in one embodiment, a reason for the backup failure may be analyzed, and one or more steps may be taken in response to the analysis. For example, liveness probes may be used across components in the backup solution to determine component failures. An anomaly may be found using static or adaptive thresholds in the network statistics to a determine bottleneck or network breakdown.

If there is a slowdown in backup operations, it may be determined whether the slowdown is a sudden spike which will go away, or a more persistent issue within the current backup operations. This may be done using a threshold on metrics over a sliding window of time instead of detecting spikes.

If a breakdown in the network topology is determined, operations relevant to the affected workflow may be aborted until the network is restored. For example, the backup operations may contain metadata of the components and network infrastructure it uses. A monitor may be used to look at the current running backup operations. If the monitor finds a network failure or bottleneck, the monitor may compare the failures with backup operation metadata to update the estimated time of the operation and abort it if deemed suitable.

For aborted backups, an estimated time to completion may continue to be calculated. When failed components are revived, the estimate may be updated accordingly. If the operation can complete before the next backup window, it may be restarted. Otherwise, waiting may be performed until a next backup window, and the log may be updated on a missing recovery point objective.

Based on system metrics and resource constraints, the backup operations may be scaled out to meet the SLA deadlines. The backup operations may have metadata regarding the resource requirements to complete them. Based on system metrics, it may be determined whether a scaling of the resources may enable completion of backup operations to meet the RPO.

In one embodiment, a system may be provided to automatically manage backup operations based on backup performance and system metrics, where the system continuously monitors system metrics and component health to estimate failure probability of backup flow, and automatically aborts backups that are estimated to fail due to avoid further network effect of failed backups potentially resulting in additional SLA violations.

Additionally, the system may periodically update failure/success probabilities of aborted operations and may retry the operations when the probability is above a system determined threshold. Further, in addition to system components and metrics, the mechanism may also collect physical network and flow information (such as failure information for routers, switches and common paths in backup flows) to improve an estimation of backup job success/failures in a distributed environment.

Further still, in a distributed or cloud computing environment, the system may collect metrics of related but outside components (such as an object storage service or object store to which backup data is offloaded) to determine if a backup job (such as offload to object store) should be aborted to avoid further penalties. Also, a root-cause for the failure (such as insufficient data mover agents, or a failed network component) may be identified and the backups may be automatically retried after the root-cause has been fixed.

In one embodiment, agent-less backup operations may be automatically managed based on backup performance and system metrics, including continuously monitoring system metrics and component health to estimate a failure probability of a backup flow using performance metrics collected by a container-orchestration system, using cloud metrics including those collected for billing and metering purposes, in a cloud environment.

Additionally, backups that are estimated to fail may be automatically aborted to avoid a further network effect of failed backups potentially resulting in additional SLA violations in a cloud environment. Further, system metrics and system status may be used to calculate an expected transfer time to backup a file, SLA and expected transfer times may be used to calculate a deadline to start a backup, SLA and system/network metrics may be used to calculate a success probability of backup executions, and failure-bound backups may be terminated where scaling out is not possible to free up resources.

Further still, a cloud environment may be scaled, where additional backup processes are not dependent upon the original container using the volume or location of the volume in a connected cloud environment. Failure-bound backup operations may be cancelled and later resumed in a different resource (node) when new resources are available due to scaling out. Also, root-causes for failure (such as insufficient data mover agents, or failed network component) may be determined, and backups may be automatically retried after a root-cause has been fixed.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    retrieving, by a computer, details of a data backup system;
        determining, by the computer, whether a first data backup operation will complete within the data backup system before a second data backup operation is scheduled to be initiated within the data backup system, based on the details of the data backup system;
        conditionally adjusting, by a computer, one or more elements of the data backup system, based on the determining;
        in response to determining that the first data backup operation will not be completed by the data backup system with the adjusted elements before the second data backup operation is scheduled to be initiated, cancelling, by the computer, the first data backup operation;
        initiating, by the computer, the second data backup operation when the second data backup operation is scheduled to be initiated;
    further adjusting the elements of the data backup system; and
        restarting the cancelled first data backup operation in response to determining that the first data backup operation will succeed with the further adjusted elements of the data backup system before the second data backup operation is scheduled to be initiated.

2. The computer-implemented method of claim 1, wherein the details of the data backup system include current performance data associated with the data backup system.

3. The computer-implemented method of claim 1, wherein the details of the data backup system include a current state of a network associated with the data backup system.

4. The computer-implemented method of claim 1, wherein the details of the data backup system include one or more predetermined capacity metrics for the data backup system.

5. The computer-implemented method of claim 1, wherein the details of the data backup system include one or more health parameters for the data backup system.

6. The computer-implemented method of claim 1, wherein the first data backup operation includes a first scheduled backup operation for one or more instances of data, and the second data backup operation includes a second scheduled backup operation for the same instances of data.

7. The computer-implemented method of claim 1, wherein the first data backup operation and the second data backup operation are initiated within the data backup system according to a predetermined schedule, and the predetermined schedule is determined based on a recovery point objective (RPO) within a service level agreement (SLA) for a user or organization.

8. The computer-implemented method of claim 1, wherein the first data backup operation includes a backup operation that is currently being performed utilizing the data backup system, and the second data backup operation includes a backup operation that is not performed utilizing the data backup system while the first data backup operation is being performed.

9. The computer-implemented method of claim 1, comprising analyzing the details of the data backup system to estimate a time of completion for the first data backup operation.

10. The computer-implemented method of claim 1, wherein in response to determining that the first data backup operation will complete before initiation of the second data backup operation, the first data backup operation is maintained, and the second data backup operation is maintained within a scheduler of the data backup system.

11. The computer-implemented method of claim 1, wherein in response to determining that the first data backup operation will not complete before an initiation of the second data backup operation:
one or more resources of the data backup system are adjusted,
updated details of the data backup system are retrieved after the adjustments have been made, and
the updated details are analyzed to determine whether the first data backup operation will now complete within the data backup system before the second data backup operation is initiated within the data backup system.

12. The computer-implemented method of claim 1, wherein in response to cancelling the first data backup operation, updated details of the data backup system are periodically retrieved and analyzed to determine whether to restart the cancelled first data backup operation; and comprising restarting the cancelled first data backup operation in response to determining that the first data backup operation will succeed before the second data backup operation is scheduled to be initiated.

13. The computer-implemented method of claim 1, wherein in response to determining that the first data backup operation will not succeed within its allocated time, the data backup system is analyzed to identify and resolve one or more specific issues within the data backup system.

14. A computer program product comprising one or more computer readable storage mediums, and program instructions collectively stored on the one or more computer readable storage mediums, the program instructions comprising instructions configured to cause one or more processors to perform a method comprising:
retrieving, by the one or more processors, details of a data backup system;
determining, by the one or more processors, whether a first data backup operation will complete within the data backup system before a second data backup operation is scheduled to be initiated within the data backup system, based on the details of the data backup system;
conditionally adjusting one or more elements of the data backup system by the one or more processors, based on the determining;
in response to determining that the first data backup operation will not be completed by the data backup system with the adjusted elements before the second data backup operation is scheduled to be initiated, cancelling the first data backup operation;
initiating the second data backup operation when the second data backup operation is scheduled to be initiated;
further adjusting the elements of the data backup system; and
restarting the cancelled first data backup operation in response to determining that the first data backup operation will succeed with the further adjusted elements of the data backup system before the second data backup operation is scheduled to be initiated.

15. The computer program product of claim 14, wherein the details of the data backup system include current performance data associated with the data backup system.

16. The computer program product of claim 14, wherein the details of the data backup system include a current state of a network associated with the data backup system.

17. The computer program product of claim 14, wherein the details of the data backup system include one or more predetermined capacity metrics for the data backup system.

18. The computer program product of claim 14, wherein the details of the data backup system include one or more health parameters for the data backup system.

19. A system, comprising:
a hardware processor; and
logic integrated with the processor, executable by the processor, or integrated with and executable by the processor, the logic being configured to:
retrieve details of a data backup system;
store the details in a hardware memory;
determine whether a first data backup operation will complete within the data backup system before a second data backup operation is initiated within the data backup system, based on the details of the data backup system;
conditionally adjust one or more elements of the data backup system, based on the determining;
in response to determining that the first data backup operation will not be completed by the data backup system with the adjusted elements before the second data backup operation is scheduled to be initiated, cancel the first data backup operation;
initiate the second data backup operation when the second data backup operation is scheduled to be initiated;
further adjust the elements of the data backup system; and
restart the cancelled first data backup operation in response to determining that the first data backup operation will succeed with the further adjusted elements of the data backup system before the second data backup operation is scheduled to be initiated.

* * * * *